June 2, 1942.  W. HETER  2,284,657
DYNAMO-ELECTRIC MACHINE
Filed June 28, 1941

Inventor:
Wylie Heter,
by Harry E. Dunham
His Attorney.

Patented June 2, 1942

2,284,657

UNITED STATES PATENT OFFICE 2,284,657

DYNAMOELECTRIC MACHINE

Wylie Heter, Scotia, N. Y., assignor to General Electric Company, a corporation of New York Application June 28, 1941, Serial No. 400,180

7 Claims. (Cl. 171—252)

My invention relates to improvements in dynamo-electric machines and particularly to ventilating systems for such machines.

An object of my invention is to provide an improved ventilating system for dynamo-electric machines.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
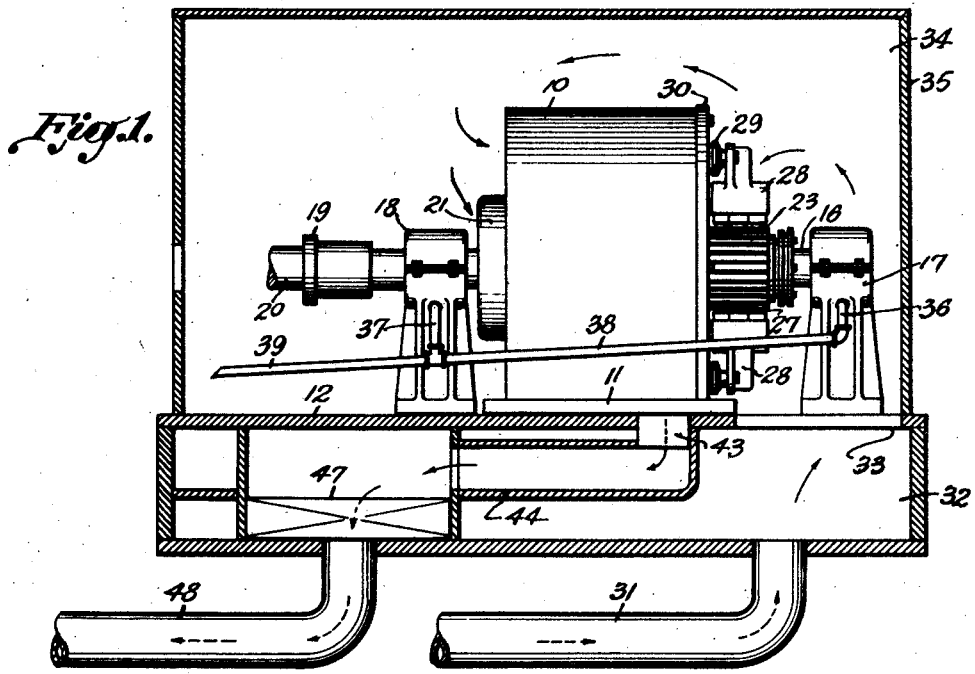
Figure 2:
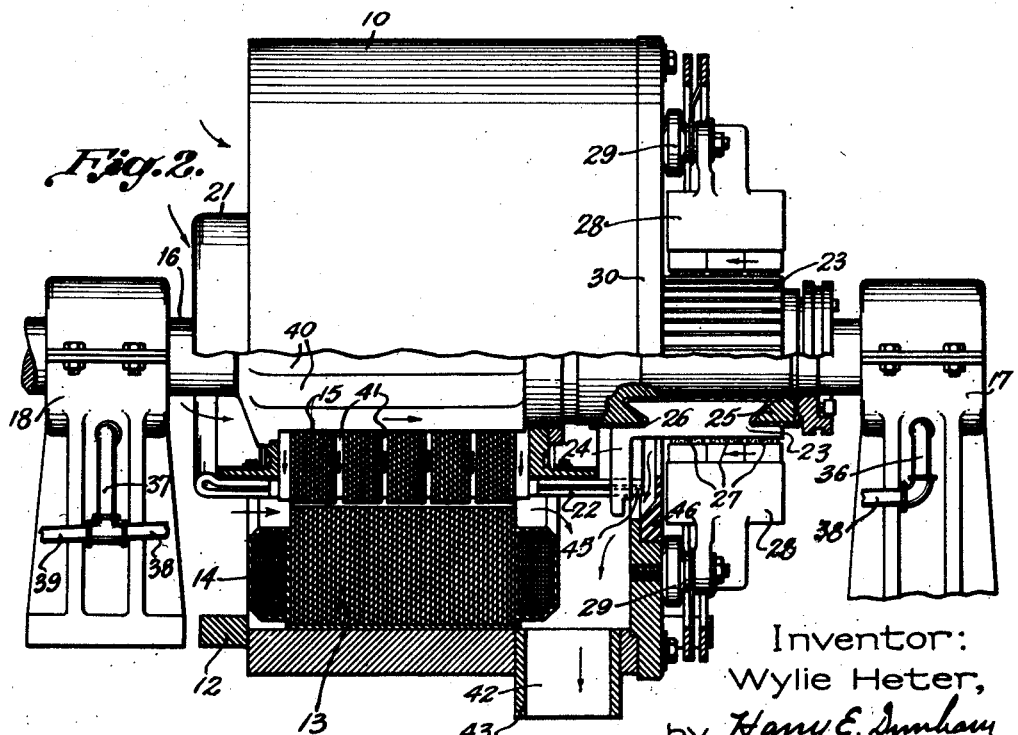

In the drawing, Fig. 1 illustrates a dynamo-electric machine and its associated equipment provided with an embodiment of my improved ventilating system; and Fig. 2 is an enlarged side elevational view, partly in section, of a dynamo-electric machine showing the details of my improved cooling system in the machine.

Referring to the drawing, I have shown a dynamo-electric machine of the commutator type which is adapted to be cooled by a substantially closed ventilating system. It is often found that the commutator temperatures limit the capacity of the machine, so that it is desirable that the flow of ventilating medium should first pass over the commutator before coming in contact with other parts of the machine. Such an arrangement, however, has been found undesirable with commutator machines, particularly if carbon brushes are used, as the wearing of the brushes produces carbon dust which is drawn into the machine and tends to collect on the machine parts and decrease the efficiency of heat transfer from the other parts of the machine, thus decreasing the efficiency of the ventilating system. The carbon dust collects on the back of open type commutator leads, lowering the insulation resistance of the machine and necessitating the cleaning of the machine at frequent intervals. My scheme of ventilation prevents this accumulation of carbon dust and practically eliminates the necessity for cleaning the machine.

The illustrated dynamo-electric machine is provided with a stationary member including a magnet frame 10 provided with supporting feet 11 adapted to support the machine on a platform structure 12. The excitation of the machine is provided by salient pole pieces secured to the frame 10 and includes pole piece cores 13 of magnetic material excited by field exciting windings 14. A rotatable member is provided which is adapted to react electrodynamically with the stationary member of the machine and includes an armature provided with a core 15 of magnetic material mounted on a shaft 16 supported at one end by a pedestal bearing 17 and at the other end by a pedestal bearing 18. A coupling 19 is secured to the shaft 16 and is arranged to provide a driving connection with another shaft 20 which extends through an opening in an enclosing housing 35 and provides a driving connection with another machine. The rotatable member is provided with an armature winding 21 arranged in slots formed in the laminated core 15, and connecting leads 22 extend from the winding 21 to a commutator provided with commutator bars 23 having riser elements 24 to which the connecting leads 22 are electrically connected. The commutator bars 23 are secured together by a clamping flange 25 and a mounting ring 26 is secured to the shaft 16. A plurality of carbon brushes 27 is adapted to provide electrical contact with the commutator, and these brushes are arranged in brush holders 28 supported by insulating mountings 29 bolted to an end shield 30 mounted on the stationary magnet frame 10.

In order to ventilate the machine, an external circulating source of ventilating medium is provided which supplies cooled and cleaned ventilating medium under pressure through a conduit 31 to a chamber 32 formed as a sub-base to the supporting platform 12. A supply opening 33 is formed in the supporting platform 12 to provide a communication between the chamber 32 and a chamber 34 which is provided about the dynamo-electric machine within an enclosing housing or casing 35. With this construction, the ventilating medium pressure on the bearings 17 and 18 is substantially equal. This is very advantageous, as these bearings are provided with a common lubricant supply system which includes conduits 36 and 37 connected together by a conduit 38 and connected to a common source of supply by another conduit 39. With such an arrangement, there would be a tendency to force the lubricant from one bearing to another, resulting in an insufficient supply of lubricant to one bearing and an over-supply of lubricant to the other bearing if the atmospheric pressure is greater on one bearing than on the other. In machines wherein the ventilating medium is adapted to be supplied to one end of the machine and exhausted from the other end of the machine, there is a tendency for the atmospheric pressure to be different on the two bearings, resulting in the above undesirable condition. In addition to insuring an adequate supply of lubricant to both bearings of the machine, my improved arrangement also insures against the deposit of carbon from the brushes 27 on the machine members by providing for separate flows of ventilating medium over the commutator and through the other machine members. As indicated by the arrows in Figs. 1 and 2, the ventilating medium enters the chamber 34 under pressure through the supply opening 33 and passes through a ventilating medium intake open end of the machine at the end thereof opposite the commutator and flows about the salient pole pieces 13 and the field exciting windings 14 over the armature 21 through axially extending passages 40 in the shaft 16 and radially outwardly through the armature core 15 through radial ventilating passages 41 formed between laminations of the core. This ventilating medium is exhausted at the commutator end of the machine on the inner or rotatable member winding side of the end shield 30 and passes through a machine exhaust 42 formed in a conduit 43 which connects with a conduit 44 arranged in the sub-base chamber 32. In this manner, only clean air is drawn through the dynamo-electric machine rotatable member and over the parts of the stationary member of the machine. In order to cool the commutator, the armature leads 22 are arranged to extend through the commutator risers 24 and extend beyond these risers in the form of ventilating medium impeller blades 45 to assist in circulating ventilating medium over the commutator. An annular plate 46 of insulating material is secured to the end shield 30 and extends to closely adjacent the outer periphery of the inner end of the commutator near the armature lead projections 45 for directing the ventilating medium flow from the inlet passage opening 33 over the commutator towards the lead projections 45. This insulating plate also provides and added protection when it is desired to change or examine the brushes 27 while the machine is in operation. The ventilating medium flow over the commutator passes into the machine adjacent the inner side of the insulating plate 46 and the end shield 30 and into the exhaust 42 where it combines the ventilating medium which has passed through the machine from the end opposite the commutator, thus insuring a separate flow of ventilating medium over the commutator and through the stationary and rotatable members of the machine. All of the ventilating medium which cools the dynamo-electric machine is exhausted from the conduit 44 into a ventilating medium filter and cooler 47 of any suitable type from which it passes through a conduit 48 to the ventilating medium source of supply, after which it is recirculated through the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a stationary member and a rotatable member provided with a winding and a commutator connected to said winding, means extending to closely adjacent the outer periphery of the inner end of said commutator for directing ventilating medium flow over said commutator and including ventilating medium impeller blades on said commutator, a ventilating medium intake to said machine at the end thereof opposite said commutator, and means including a ventilating medium exhaust adjacent said commutator on the inner side of said commutator ventilating medium directing means arranged to exhaust a separate flow of ventilating medium through said dynamo-electric machine members from the end thereof opposite said commutator and from over said commutator.

2. A dynamo-electric machine having a stationary member and a rotatable member provided with a winding and a commutator connected to said winding, means including an insulating plate arranged to extend to closely adjacent the outer periphery of the inner end of said commutator for directing ventilating medium flow over said commutator and including ventilating medium impeller blades on said commutator, a ventilating medium intake to said machine at the end thereof opposite said commutator, and means including a ventilating medium exhaust adjacent said commutator on the inner side of said insulating plate arranged to exhaust a separate flow of ventilating medium through said dynamo-electric machine members from the end thereof opposite said commutator and from over said commutator.

3. A dynamo-electric machine having a stationary member and a rotatable member provided with a winding and a commutator connected to said winding, means including a bearing adjacent each end of said rotatable member for supporting the same, means including an insulating plate arranged to extend to closely adjacent the outer end of said commutator for directing ventilating medium axially and inwardly flow over said commutator, a ventilating medium intake to said machine at the end thereof opposite said commutator, and means including a ventilating medium exhaust adjacent said commutator on the inner side of said insulating plate arranged to exhaust a separate flow of ventilating medium through said dynamo-electric machine members from the end thereof opposite said commutator and from over said commutator and for maintaining substantially equal ventilating medium pressures on said bearings.

4. A dynamo-electric machine having a stationary member and a rotatable member provided with a winding and a commutator connected to said winding, means including a bearing adjacent each end of said rotatable member for supporting the same, means extending to closely adjacent the outer periphery of said commutator for directing ventilating medium axially and inwardly flow over said commutator, a ventilating medium intake to said machine at the end thereof opposite said commutator, means including a ventilating medium exhaust adjacent said commutator on the inner side of said commutator ventilating medium directing means arranged to exhaust a separate flow of ventilating medium through said dynamo-electric machine members from the end thereof opposite said commutator and from over said commutator and for maintaining substantially equal ventilating medium pressures on said bearings, and means for cleaning the ventilating medium passing from said machine exhaust.

5. A dynamo-electric machine having a stationary member and a rotatable member provided with a winding and a commutator connected to said winding, means including a bearing adjacent each end of said rotatable member for supporting the same, means including an insulating plate arranged to extend to closely adjacent the outer periphery of the inner end of said commutator for directing ventilating medium axially and inwardly flow over said commutator, a ventilating medium intake to said machine at the end thereof opposite said commutator, means including a ventilating medium exhaust adjacent said commutator on the inner side of said insulating plate arranged to exhaust a separate flow of ventilating medium through said dynamo-electric machine members from the end thereof opposite said commutator and from over said commutator and for maintaining substantially equal ventilating medium pressures on said bearings, and means for cleaning the ventilating medium passing from said machine exhaust.

6. A dynamo-electric machine having a stationary member and a rotatable member provided with a winding and a commutator having risers for connecting said winding thereto, said winding having connecting leads electrically connected to said commutator risers and projecting therethrough towards said commutator forming impeller blades adapted to assist in circulating ventilating medium over said commutator, means including an insulating plate arranged to extend to closely adjacent the outer periphery of the inner end of said commutator for directing ventilating medium axially and inwardly flow over said commutator towards said lead projections, a ventilating medium intake to said machine at the end thereof opposite said commutator, means including a ventilating medium exhaust adjacent said commutator on the rotatable member winding side of said insulating plate for exhausting a separate flow of ventilating medium through said dynamo-electric machine members and over said commutator, and means for cleaning and cooling the ventilating medium passing from said machine exhaust.

7. A dynamo-electric machine having a stationary member and a rotatable member provided with a winding and a commutator having risers for connecting said winding thereto, said winding having connecting leads electrically connected to said commutator risers and projecting therethrough towards said commutator forming impeller blades adapted to assist in circulating ventilating medium over said commutator, means including a bearing adjacent each end of said rotatable member for supporting said rotatable member, means including an insulating plate arranged to extend to closely adjacent the outer periphery of the inner end of said commutator for directing ventilating medium flow over said commutator towards said lead projections. a ventilating medium intake to said machine at the end thereof opposite said commutator, means including a ventilating medium exhaust adjacent said commutator on the rotatable member winding side of said insulating plate for exhausting a separate flow of ventilating medium through said dynamo-electric machine members and over said commutator and for maintaining substantially equal ventilating medium pressures on said bearings, and means for cleaning the ventilating medium passing from said machine exhaust.

WYLIE HETER.